US012322898B2

(12) United States Patent
Bucher et al.

(10) Patent No.: US 12,322,898 B2
(45) Date of Patent: Jun. 3, 2025

(54) HEAT SINK ASSEMBLY FOR AN ELECTRICAL CONNECTOR ASSEMBLY

(71) Applicant: TE CONNECTIVITY CORPORATION, Berwyn, PA (US)

(72) Inventors: Alan Weir Bucher, Manheim, PA (US); Leo Joseph Graham, Hershey, PA (US)

(73) Assignee: TE CONNECTIVITY SOLUTIONS GmbH, Schaffhausen (CH)

(*) Notice: Subject to any disclaimer, the term of this patent is extended or adjusted under 35 U.S.C. 154(b) by 1268 days.

(21) Appl. No.: 16/856,129

(22) Filed: Apr. 23, 2020

(65) Prior Publication Data

US 2020/0373706 A1 Nov. 26, 2020

Related U.S. Application Data

(60) Provisional application No. 62/851,150, filed on May 22, 2019.

(51) Int. Cl.
*H01R 13/533* (2006.01)

(52) U.S. Cl.
CPC .................................. *H01R 13/533* (2013.01)

(58) Field of Classification Search
CPC .................................................... H01R 13/533
See application file for complete search history.

(56) References Cited

U.S. PATENT DOCUMENTS

| | | | | |
|---|---|---|---|---|
| 6,910,271 B2 * | 6/2005 | Peterson | F28F 23/00 165/185 |
| 7,563,118 B1 * | 7/2009 | McCauley | H01R 13/533 439/260 |
| 8,858,258 B2 * | 10/2014 | Stokowski | H01R 13/533 439/582 |
| 9,343,851 B2 | 5/2016 | Bucher et al. | |
| 9,509,102 B2 * | 11/2016 | Sharf | H05K 7/20436 |
| 9,620,890 B1 * | 4/2017 | Vino, IV | G02B 6/4293 |

(Continued)

FOREIGN PATENT DOCUMENTS

| | | |
|---|---|---|
| CN | 1187103 A | 7/1998 |
| CN | 101076231 A | 11/2007 |

(Continued)

OTHER PUBLICATIONS

U.S. Appl. No. 16/927,446, filed Jul. 13, 2020 (38 pages).
U.S. Appl. No. 16/242,411, filed Jan. 8, 2019 (35 pages).

*Primary Examiner* — Gordon A Jones

(57) ABSTRACT

A heat sink assembly includes an upper heat sink element having upper plates each having sides between front and rear ends and each having inner and outer ends and a lower heat sink element having lower plates each having sides between front and rear ends and each having inner and outer ends. The lower plates include lower spacer plates and lower interface plates with the outer ends thereof thermally coupled to an electronic module. The lower interface plates include interface fins interfacing with the upper plates. The heat sink assembly includes a spring element having an upper spring member engaging the inner ends of the upper plates to bias the upper plates in a first biasing direction away from the lower plates and having a lower spring member engaging the inner ends of the lower plates to bias the lower plates in a second biasing direction away from the upper plates.

21 Claims, 3 Drawing Sheets

(56) References Cited

U.S. PATENT DOCUMENTS

| | | | | |
|---|---|---|---|---|
| 9,668,379 | B1 | 5/2017 | Bucher | |
| 9,668,380 | B2 | 5/2017 | Bucher | |
| 9,841,772 | B2 | 12/2017 | Bucher | |
| 9,912,107 | B2 | 3/2018 | Bucher | |
| 10,811,794 | B2 * | 10/2020 | Annis ................ | H01R 13/2492 |
| 10,993,352 | B2 | 4/2021 | Bucher | |
| 2009/0269989 | A1 * | 10/2009 | Bergner ................. | H01R 24/64 439/676 |
| 2016/0211623 | A1 * | 7/2016 | Sharf ................... | G02B 6/4269 |
| 2020/0373706 | A1 | 11/2020 | Bucher et al. | |
| 2021/0084791 | A1 | 3/2021 | Bucher | |

FOREIGN PATENT DOCUMENTS

| | | | |
|---|---|---|---|
| CN | 101123228 | A | 2/2008 |
| CN | 101193533 | A | 6/2008 |
| CN | 104010476 | A | 8/2014 |
| CN | 204205160 | U | 3/2015 |
| CN | 104604352 | A | 5/2015 |
| CN | 204669794 | U | 9/2015 |
| CN | 208128688 | U | 11/2018 |
| CN | 109786996 | A | 5/2019 |
| TW | 200525337 | A | 8/2005 |

* cited by examiner

HEAT SINK ASSEMBLY FOR AN ELECTRICAL CONNECTOR ASSEMBLY

CROSS REFERENCE TO RELATED APPLICATIONS

This application claims benefit to U.S. Provisional Application No. 62/851,150, filed 22 May 2019, titled "HEAT SINK ASSEMBLY FOR AN ELECTRICAL CONNECTOR ASSEMBLY", the subject matter of which is herein incorporated by reference in its entirety.

BACKGROUND OF THE INVENTION

The subject matter herein relates generally to electrical connector assemblies.

It may be desirable to transfer thermal energy (or heat) away from designated components of a system or device. For example, electrical connectors may be used to transmit data and/or electrical power to and from different systems or devices. One type of electrical connector assembly uses pluggable modules received in a receptacle assembly. Data signals may be transmitted through the communication cable(s) in the form of optical signals and/or electrical signals.

A common challenge that confronts developers of electrical systems is heat management. Thermal energy generated by internal electronics within a system can degrade performance or even damage components of the system. To dissipate the thermal energy, systems include a thermal component, such as a thermal bridge, which engages the heat source, absorbs the thermal energy from the heat source, and transfers the thermal energy away. The thermal bridge is typically thermally coupled to another thermal component at yet another thermal interface. The components lose efficiency at each thermal interface. Additionally, it is difficult to achieve efficient thermal coupling at the interfaces due to variations in the surfaces, such as due to surface flatness of the interfacing surfaces.

Accordingly, there is a need for a thermal-transfer assembly that transfers thermal energy away from a component, such as the internal electronics of an electrical connector, having reduced thermal resistance.

BRIEF DESCRIPTION OF THE INVENTION

In one embodiment, a heat sink assembly is provided. The heat sink includes an upper heat sink element. The upper heat sink element includes a plurality of upper plates arranged in an upper plate stack. Each upper plate has a front end and a rear end. Each upper plate has sides between the front end and the rear end. Each upper plate has an inner end and an outer end. The heat sink includes a lower heat sink element. The lower heat sink element includes a plurality of lower plates arranged in a lower plate stack. Each lower plate has a front end and a rear end. Each lower plate has sides between the front end and the rear end. Each lower plate has an inner end and an outer end. The lower plates include lower spacer plates and lower interface plates. The outer ends of the lower spacer plates and the outer ends of the lower interface plates are configured to face and thermally couple to an electronic module. The lower interface plates include interface fins extending above the inner ends of the lower spacer plates to interface with the upper plates. The heat sink assembly includes a spring element positioned between the upper heat sink element and the lower heat sink element. The spring element includes an upper spring member engaging the inner ends of the upper plates. The upper spring member biases the upper plates in a first biasing direction generally away from the lower plates. The spring element includes a lower spring member engaging the inner ends of the lower plates. The lower spring element biases the lower plates in a second biasing direction generally away from the upper plates.

In another embodiment, a heat sink assembly is provided. The heat sink assembly includes an upper heat sink element. The upper heat sink element includes a plurality of upper plates arranged in an upper plate stack. Each upper plate has a front end and a rear end. Each upper plate has sides between the front end and the rear end. Each upper plate has an inner end and an outer end. The upper plates include upper fin plates. Each upper fin plate includes a base at the inner end and a heat dissipating fin at the outer end. The upper fin plates are arranged within the upper plate stack at spaced apart locations relative to each other such that airflow channels are formed between the heat dissipating fins. The heat sink assembly includes a lower heat sink element. The lower heat sink element includes a plurality of lower plates arranged in a lower plate stack. Each lower plate has a front end and a rear end. Each lower plate has sides between the front end and the rear end. Each lower plate has an inner end and an outer end. The lower plates include lower spacer plates and lower interface plates. The outer ends of the lower spacer plates and the outer ends of the lower interface plates are configured to face and thermally couple to an electronic module. The lower interface plates include interface fins extending into the upper plate stack of the upper heat sink element. The interface fins are thermally coupled to corresponding bases of the upper fin plates. The heat sink assembly includes spring element positioned between the upper heat sink element and the lower heat sink element. The spring element includes an upper spring member engaging the inner ends of the upper plates, The upper spring member biases the upper plates in a first biasing direction generally away from the lower plates. The spring element includes a lower spring member engaging the inner ends of the lower plates. The lower spring element biases the lower plates in a second biasing direction generally away from the upper plates.

In a further embodiment, a receptacle assembly is provided. The receptacle assembly includes a receptacle cage having cage walls defining a cavity having a module channel configured to receive a pluggable module. The cage walls include a top wall above the module channel. The top wall has an opening. The receptacle assembly includes a heat sink assembly coupled to the receptacle cage. The heat sink assembly includes an upper heat sink element, a lower heat sink element, and a spring element. The upper heat sink element extends above the top wall. The lower heat sink assembly extends into the opening in the top wall to couple to the pluggable module. The receptacle assembly includes the upper heat sink element. The upper heat sink element includes a plurality of upper plates arranged in an upper plate stack. Each upper plate has a front end and a rear end. Each upper plate has sides between the front end and the rear end. Each upper plate has an inner end and an outer end. The upper plates include upper fin plates. Each upper fin plate includes a base at the inner end and a heat dissipating fin at the outer end. The heat dissipating fins are located above the top wall. The upper fin plates are arranged within the upper plate stack at spaced apart locations relative to each other such that airflow channels are formed between the heat dissipating fins. The receptacle assembly includes the lower heat sink element. The lower heat sink element includes a plurality of lower plates arranged in a lower plate stack. Each lower plate has a front end and a rear end. Each lower plate has sides between the front end and the rear end. Each lower plate has an inner end and an outer end. The lower plates include lower spacer plates and lower interface plates. The outer ends of the lower spacer plates and the outer ends of the lower interface plates are positioned in the cavity of the receptacle cage to thermally couple to the pluggable module. The lower interface plates include interface fins extending into the upper plate stack of the upper heat sink element. The interface fins are thermally coupled to corresponding bases of the upper fin plates. The receptacle assembly includes the spring element positioned between the upper heat sink element and the lower heat sink element. The spring element includes an upper spring member engaging the inner ends of the upper plates. The upper spring member biases the upper plates in a first biasing direction generally away from the lower plates. The spring element includes a lower spring member engaging the inner ends of the lower plates. The lower spring element biases the lower plates in a second biasing direction generally away from the upper plates.

DETAILED DESCRIPTION OF THE INVENTION

Figure 1:
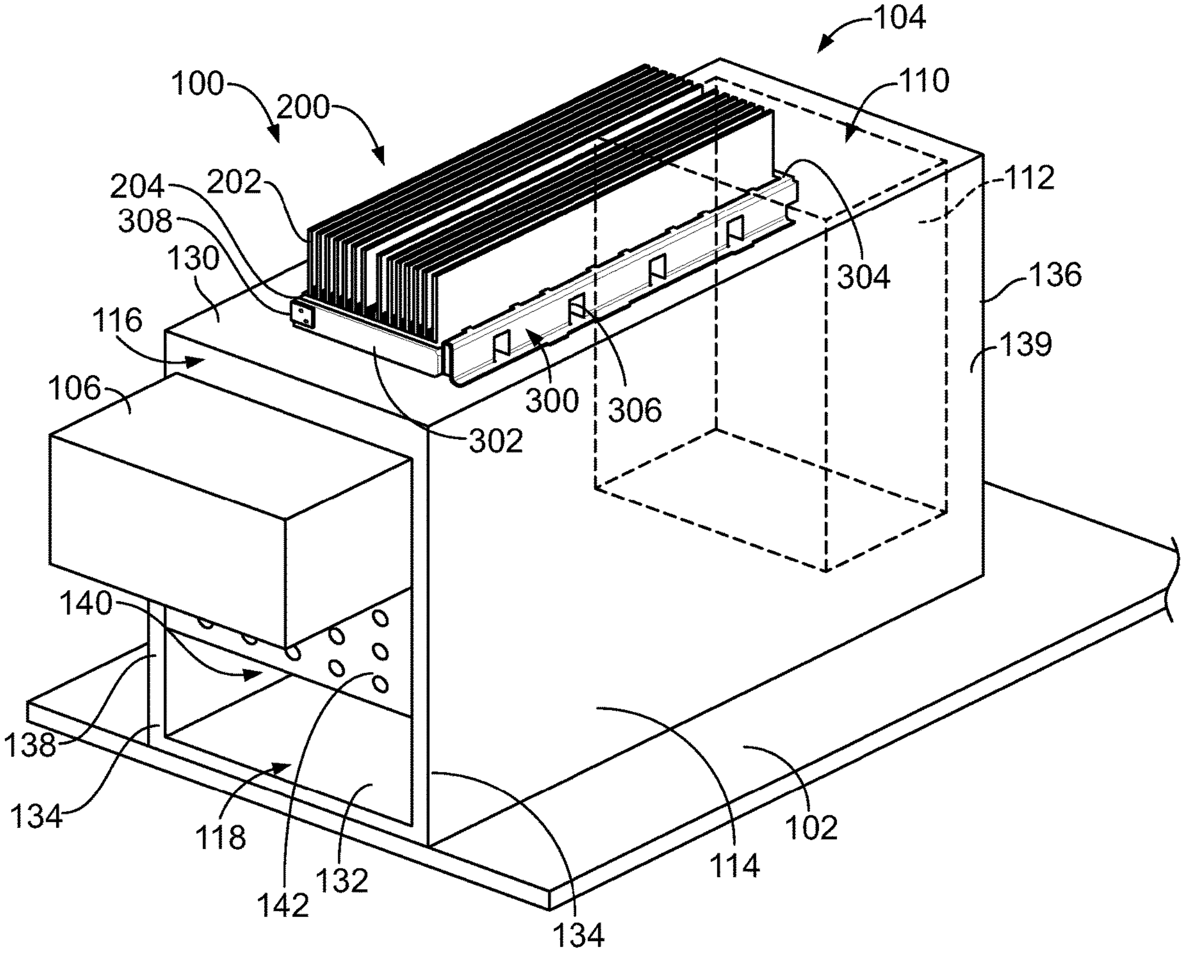
FIG. 1 is a front perspective view of an electrical connector assembly having a heat sink assembly formed in accordance with an exemplary embodiment.

FIG. 1 is a front perspective view of an electrical connector assembly 100 formed in accordance with an exemplary embodiment. The electrical connector assembly 100 includes a host circuit board 102 and a receptacle assembly 104 mounted to the circuit board 102. Pluggable modules 106 are configured to be electrically connected to the receptacle assembly 104. The pluggable modules 106 are electrically connected to the circuit board 102 through the receptacle assembly 104.

In an exemplary embodiment, the receptacle assembly 104 includes a receptacle cage 110 and a communication connector 112 (shown in phantom) adjacent the receptacle cage 110. For example, in the illustrated embodiment, the communication connector 112 is received in the receptacle cage 110. In other various embodiments, the communication connector 112 may be located rearward of the receptacle cage 110. In various embodiments, the receptacle cage 110 is enclosed and provides electrical shielding for the communication connector 112. The pluggable modules 106 are configured to be loaded into the receptacle cage 110 and surrounded by the receptacle cage 110. The receptacle cage 110 includes a plurality of cage walls 114 that define one or more module channels for receipt of corresponding pluggable modules 106. The cage walls 114 may be walls defined by solid sheets, perforated walls to allow airflow therethrough, walls with cutouts, such as for a heatsink or heat spreader to pass therethrough, or walls defined by rails or beams with relatively large openings, such as for airflow therethrough. In an exemplary embodiment, the receptacle cage 110 is a shielding, stamped and formed cage member with the cage walls 114 being shielding walls.

In the illustrated embodiment, the receptacle cage 110 constitutes a stacked cage member having an upper module channel 116 and a lower module channel 118. The receptacle assembly 104 is configured to mate with the pluggable modules 106 in both stacked module channels 116, 118. The receptacle cage 110 has module ports that open to the module channels 116, 118, respectively, which receive corresponding upper and lower pluggable modules 106. Any number of module channels may be provided in various embodiments. In the illustrated embodiment, the receptacle cage 110 includes the upper and lower module channels 116, 118 arranged in a single column; however, the receptacle cage 110 may include multiple columns of ganged module channels 116, 118 in alternative embodiments (for example, 2×2, 3×2, 4×2, 4×3, etc.). Optionally, multiple communication connectors 112 may be arranged within the receptacle cage 110, such as when multiple columns of module channels 116 and/or 118 are provided. In other various embodiments, the receptacle cage 110 may include a single module channel 116 or a single row of module channels 116 rather than being a stacked receptacle cage.

In an exemplary embodiment, the cage walls 114 of the receptacle cage 110 include a top wall 130, a bottom wall 132, side walls 134, and a rear wall 136. The bottom wall 132 may rest on the host circuit board 102. However, in alternative embodiments, the receptacle cage 110 may be provided without the bottom wall 132. The receptacle cage 110 extends between a front end 138 and a rear end 139. The module ports are provided at the front end 138 and receive the pluggable modules 106 through the front end 138. The cage walls 114 define a cavity 140. For example, the cavity 140 may be defined by the top wall 130, the bottom wall 132, the side walls 134, and the rear wall 136. Other cage walls 114 may separate or divide the cavity 140 into the various module channels 116, 118. For example, the cage walls 114 may include a port separator 142 between the upper and lower module channels 116, 118. The port separator 142 forms a space between the upper and lower module channels 116, 118, such as for airflow or for routing light pipes. In other various embodiments, the cage walls 114 may include vertical separator panels (not shown), such as parallel to the side walls 134, between ganged module channels 116 and/or 118.

The receptacle assembly 104 includes a heat sink assembly 200 for dissipating heat from the pluggable modules 106, such as the upper pluggable module 106 in the upper module channel 116. In an exemplary embodiment, the heat sink assembly 200 includes an upper heat sink element 202, a lower heat sink element 204, and a spring element 206 (shown in FIG. 4) between the upper and lower heat sink elements 202, 204. The lower heat sink element 204 is configured to thermally engage the upper pluggable module 106 received in the upper module channel 116. The upper heat sink element 202 is configured to dissipate heat into the external environment outside of the receptacle cage 110 (for example, above the receptacle cage 110). The upper heat sink element 202 is in thermal communication with the lower heat sink element 204 and dissipates heat away from the lower heat sink element 204 to cool the pluggable module 106. The upper heat sink element 202 is a finned heat sink in the illustrated embodiment with the fins extended upward for transfer of heat to passing airflow. In other various embodiments, the upper heat sink element 202 may be a heat spreader, a thermal bridge, a cold plate, and the like. The upper heat sink element 202 may be thermally coupled to another thermal component, such as a heat spreader, to dissipate heat from the heat sink assembly 200.

In an exemplary embodiment, the heat sink assembly 200 is coupled to a frame 300. The frame 300 extends from the receptacle cage 110, such as from the top wall 130. The lower heat transfer element 204 may extend through openings in the frame 300 to directly engage the pluggable module 106.

The frame 300 includes a front rail 302, a rear rail 304 and side walls 306, 308 extend between the front rail 302 and the rear rail 304. The upper heat sink element 202 and the lower heat sink element 204 are contained between the side walls 306. In an exemplary embodiment, the upper heat sink element 202 is coupled to the front rail 302 and the rear rail 304 and the lower heat sink element 204 is coupled to the front rail 302 and the rear rail 304. In an exemplary embodiment, the spring element 206 presses the upper heat sink element 202 outward in a first biasing direction (for example, upward) against the front and rear rails 302, 304 and the spring element 206 presses the lower heat sink element 204 outward in a second biasing direction (for example, downward) against the front and rear rails 302, 304. The upper heat sink element 202 and the lower heat sink element 204 may be held within the frame 300. Alternatively, the frame 300 may allow a limited amount of floating movement of the upper heat sink element 202 and the lower heat sink element 204 within the frame 300, such as side-to-side and/or front-to-rear.

The communication connector 112 is coupled to the circuit board 102. The receptacle cage 110 is mounted to the circuit board 102 over the communication connector 112. In an exemplary embodiment, the communication connector 112 is received in the cavity 140, such as proximate to the rear wall 136. However, in alternative embodiments, the communication connector 112 may be located behind the rear wall 136 exterior of the receptacle cage 110 and extend into the cavity 140 to interface with the pluggable module(s) 106. For example, the rear wall 136 may include an opening to receive components therethrough. In an exemplary embodiment, a single communication connector 112 is used to electrically connect with the pair of stacked pluggable modules 106 in the upper and lower module channels 116, 118. In alternative embodiments, the electrical connector assembly 100 may include discrete, stacked communication connectors 112 (for example, an upper communication connector and a lower communication connector) for mating with the corresponding pluggable modules 106.

In an exemplary embodiment, the pluggable modules 106 are loaded into the receptacle cage 110 through the front end 138 to mate with the communication connector 112. The shielding cage walls 114 of the receptacle cage 110 provide electrical shielding around the communication connector 112 and the pluggable modules 106, such as around the mating interfaces between the communication connector 112 and the pluggable modules 106.

Figure 2:
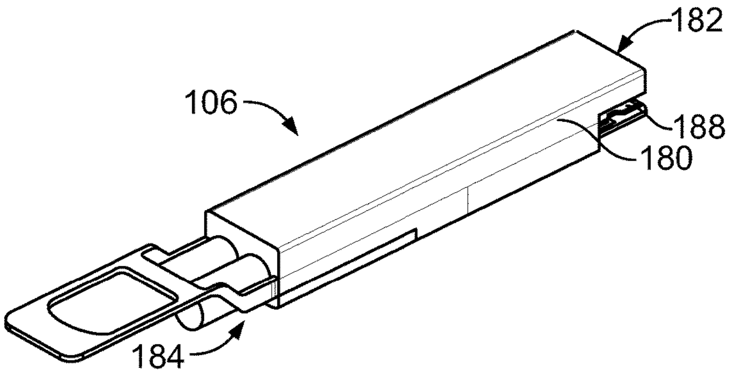
FIG. 2 is a rear perspective view of a pluggable module for the electrical connector assembly in accordance with an exemplary embodiment.

FIG. 2 is a rear perspective view of the pluggable module 106 in accordance with an exemplary embodiment. The pluggable module 106 has a pluggable body 180, which may be defined by one or more shells. The pluggable body 180 includes sides, a top, and a bottom. The pluggable body 180 may be thermally conductive and/or may be electrically conductive, such as to provide EMI shielding for the pluggable module 106. The pluggable body 180 includes a mating end 182 and an opposite front end 184. The front end 184 may be a cable end having a cable extending therefrom to another component within the system. The mating end 182 is configured to be inserted into the corresponding module channel 116 or 118 (shown in FIG. 1).

The pluggable module 106 includes a module circuit board 188 that is configured to be communicatively coupled to the communication connector 112 (shown in FIG. 1). The module circuit board 188 may be accessible at the mating end 182. The module circuit board 188 may include components, circuits and the like used for operating and/or using the pluggable module 106. For example, the module circuit board 188 may have conductors, traces, pads, electronics, sensors, controllers, switches, inputs, outputs, and the like associated with the module circuit board 188, which may be mounted to the module circuit board 188, to form various circuits.

In an exemplary embodiment, the pluggable body 180 provides heat transfer for the module circuit board 188, such as for the electronic components on the module circuit board 188. For example, the module circuit board 188 is in thermal communication with the pluggable body 180 and the pluggable body 180 transfers heat from the module circuit board 188. In an exemplary embodiment, the pluggable body 180 includes a thermal interface along the top for interface with the heat sink assembly 200 (shown in FIG. 1).

Figure 3:
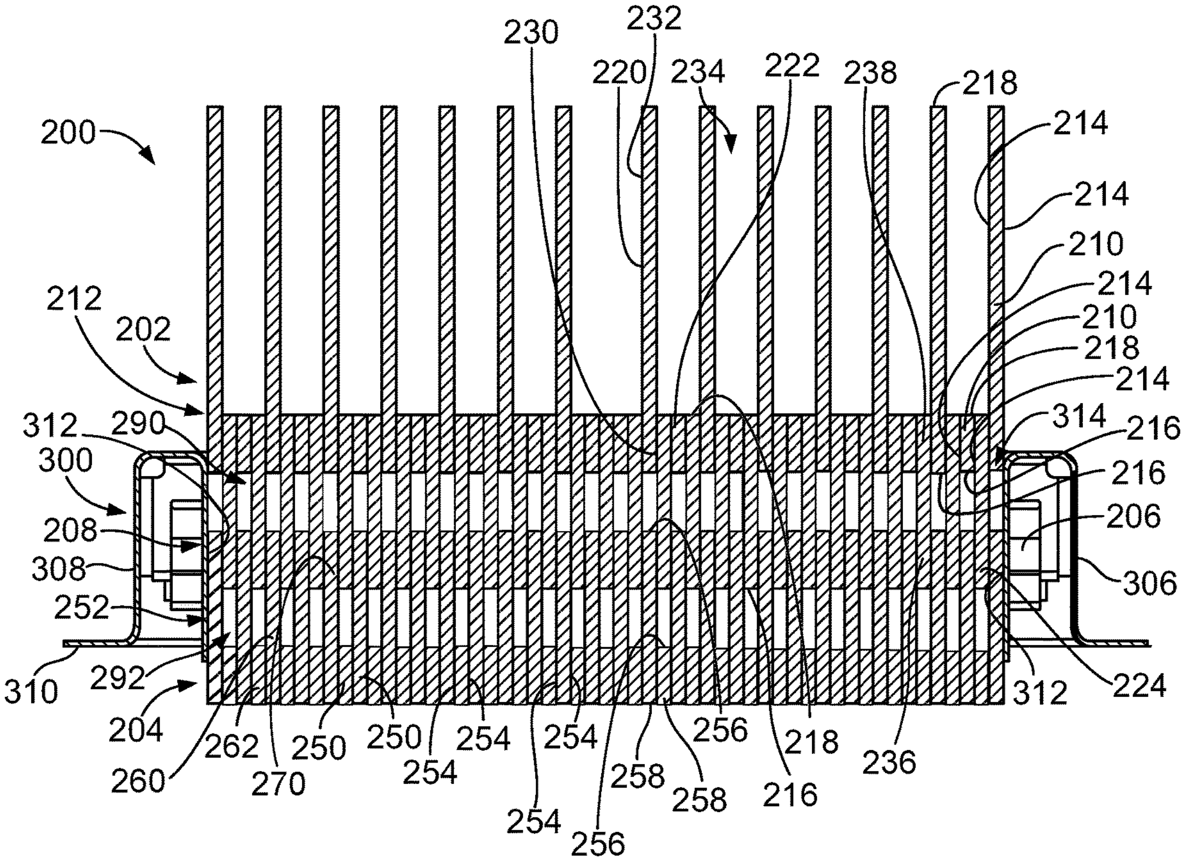
FIG. 3 is a cross-sectional view of the heat sink assembly in accordance with an exemplary embodiment.

FIG. 3 is a cross-sectional view of the heat sink assembly 200 in accordance with an exemplary embodiment. The heat sink assembly 200 includes the upper heat sink element 202 and the lower heat sink element 204. The spring element 206 is located between the upper and lower heat sink elements 202, 204 at an interface region 208 of the heat sink assembly 200. The frame 300 holds the upper and lower heat sink elements 202, 204. In an exemplary embodiment, the upper heat sink element 202 is movable relative to the lower heat sink element 204. For example, the spring element 206 forces the upper and lower heat sink elements 202, 204 apart from each other. The spring element 206 forces the upper heat sink element 202 in a first biasing direction, such as upward, and the lower heat sink element 204 in a second biasing direction, such as downward. In an exemplary embodiment, the spring element 206 is separate and discrete from the upper and lower heat sink elements 202, 204. The spring element 206 may be a stamped and formed part. The spring element 206 is manufactured from a thin metal material such that the spring element 206 is flexible.

In an exemplary embodiment, heat sink elements 202, 204 each include a plurality of plates that are arranged together in plate stacks. The plates are interleaved with each other for thermal communication between the upper heat sink element 202 and the lower heat sink element 204. The individual plates are movable relative to each other such that the plates may be individually articulated to conform to the upper surface of the pluggable module 106 (shown in FIG. 2) for improved contact and/or proximity between the heat sink assembly 200 and the pluggable module 106. A gap or space may be provided between the plates of the heat sink elements 202, 204 to allow compressive movement of the spring element 206 between the heat sink elements 202, 204.

In an exemplary embodiment, the upper heat sink element 202 includes a plurality of upper plates 210 arranged in an upper plate stack 212. Each upper plate 210 has sides 214 extending between an inner end 216 and an outer end 218 of the upper plate 210. The inner end 216 faces the lower heat sink element 204. The outer end 218 is located outside of the frame 300, such as above a top frame, such as for air cooling or for connection to another thermal component, such as a heat spreader. Optionally, various upper plates 210 may have different heights between the inner end 216 and the outer end 218. For example, some of the upper plates 210 may be taller to form heat dissipating fins for the heat sink assembly 200 for airflow cooling of the upper heat sink element 202.

In an exemplary embodiment, the upper plates 210 include upper fin plates 220, upper spacer plates 222, and upper interface plates 224. The upper fin plates 220 are taller than the spacer plates 222 and extend further outward than the upper spacer plates 222 and the upper interface plates 224. For example, the outer ends 218 of the upper fin plates 220 are located further from the lower heat sink element 204 than the outer ends 218 of the upper spacer plates 222 and the outer ends 218 of the upper interface plates 224. Each upper fin plate 220 includes a base 230 at the inner end 216 and a heat dissipating fin 232 at the outer end 218. The upper fin plates 220 are arranged within the upper plate stack 212 at spaced apart locations relative to each other such that airflow channels 234 are formed between the heat dissipating fins 232. The airflow channels 234 are located exterior of the frame 300 to allow airflow through the upper heat sink element 202 along the sides 214 of the upper fin plates 220 for convection cooling of the upper heat sink element 202. The inner ends 216 of the upper interface plates 224 extend into the interface region 208 to interface with the lower heat sink element 204. The upper interface plates 224 include interface fins 236 extending into the interface region 208 to thermally couple to the lower heat sink element 204. The upper interface plates 224 include bases 238 at the outer ends 218. The bases 238 interface with the upper fin plates 220 and the upper spacer plates 222.

In an exemplary embodiment, the lower heat sink element 204 includes a plurality of lower plates 250 arranged in a lower plate stack 252. Each lower plate 250 has sides 254 extending between an inner end 256 and an outer end 258 of the lower plate 250. The inner end 256 faces the upper heat sink element 202. The outer end 258 may be located outside of the frame 300, such as below a bottom of the frame 300, such as for thermal coupling with the pluggable module 106 (or another thermal component, such as a heat spreader. Optionally, various lower plates 250 may have different heights between the inner end 256 and the outer end 258. For example, some of the lower plates 250 may be taller to form interface fins that span across the gap between the heat sink elements 202, 204 for interfacing with the upper heat sink element 202.

In an exemplary embodiment, the lower plates 250 include lower interface plates 260 and lower spacer plates 262. In the illustrated embodiment, the lower plate stack 252 has a plate arrangement of alternating lower interface plates 260 and lower spacer plates 262; however, other arrangements are possible in alternative embodiments. The outer ends 258 of the lower spacer plates 262 and the outer ends 258 of the lower interface plates 260 are configured to face and thermally couple to the pluggable module 106. Optionally, the outer ends 258 of the lower spacer plates 262 and the outer ends 258 of the lower interface plates 260 may be generally coplanar at the bottom of the heat sink assembly 200. The lower interface plates 260 are taller than the lower spacer plates 262 and extend further upward than the lower spacer plates 222. For example, the inner ends 216 of the lower interface plates 260 are located further from the bottom of the heat sink assembly 200 than the inner ends 216 of the lower spacer plates 262. The inner ends 256 of the lower interface plates 260 extend into the interface region 208 to interface with the upper interface plates 224. The lower interface plates 260 include interface fins 270 extending into the interface region 208 to thermally couple to the upper plate stack 212 of the upper heat sink element 202. The interface fins 270 are thermally coupled to corresponding upper interface plates 224 of the upper fin plates 220. For example, the sides 254 of the interface fins 270 face the sides 214 of the upper interface plates 224 for thermal coupling therebetween. The sides 254 may directly engage the corresponding sides 214. In other various embodiments, the sides 254 may be in close physical relation to the sides 214 sufficient to allow efficient thermal coupling between the lower plates 250 and the upper plates 210.

In the illustrated embodiment, the upper plate stack 212 has a plate arrangement with an upper fin plate 220, an upper interface plate 224, an upper spacer plate 222, and another upper interface plate 224 in a repeating pattern. In the illustrated embodiment, the lower plate stack 252 has a plate arrangement with alternating lower interface plates 260 and lower spacer plates 262 in a repeating pattern. At the interface region 208, the heat sink assembly 200 has a plate arrangement of alternating upper interface plates 224 and lower interface plates 260. Air gaps 290 are provided between the lower interface plates 260 and the upper fin plates 220 or the upper spacer plates 222. For example, the air gaps 290 are located between the inner ends 256 of the lower interface plates 260 and the inner ends 216 of the upper fin plates 220 or the upper spacer plates 222. Air gaps 292 are provided between the upper interface plates 224 and the lower spacer plates 262. For example, the air gaps 292 are located between the inner ends 216 of the upper interface plates 224 and the inner ends 256 of the lower spacer plates 262. The lower interface plates 260 are thermally coupled to the adjacent upper interface plates 224. The sides 214, 254 are overlapping by an overlap distance sufficient to allow efficient thermal transfer between the lower plates 250 and the upper plates 210. The sides 214, 254 are slidable relative to each other to allow movement between the upper plates 210 and the lower plates 250 and change the overlap distance. For example, the lower interface plates 260 may move into the upper air gaps 290 and the upper interface plates 224 may move into the lower air gaps 292 as the upper and lower plate stacks 212, 252 are compressed, such as when the lower plate stack 252 is mated with the pluggable module. Other arrangements are possible in alternative embodiments, including embodiments that do not include upper fin plates 220 or embodiments that do not include upper spacer plates 222. In other various embodiments, the upper interface plates 224 and the upper fin plates 220 may be combined within the same plate. For example, the combined plate may extend above the spacer plates 222 and below the spacer plates. While the upper plates 210 and the lower plates 250 are illustrated as being planar, rectangular plates, it is realized that the plates 210, 250 may have other sizes and shapes in alternative embodiments.

The frame 300 includes a base 310, which may be used for mounting the frame 300 to the top wall 130 (shown in FIG. 1) of the receptacle cage 110 (shown in FIG. 1). The side walls 306, 308 extend from the base 310. In an exemplary embodiment, each side wall 306, 308 includes a support wall 312. An opening 314 is defined between the support walls 312. The heat sink elements 202, 204 are received in the opening 314 between the support walls 312. The spring element 206 may be coupled to the side walls 306, 308. For example, the spring element 206 spans side-to-side across the opening 314 between the side walls 306, 308.

The support walls 312 face the upper plates 210 and the lower plates 250 of the heat sink elements 202, 204, and may engage the upper plates 210 and/or the lower plates 250 to position the upper and lower plate stacks 212, 252 between the support walls 312. Optionally, the support walls 312 may compress or squeeze the upper and lower plate stacks 212, 252 to press the upper plates 210 and the lower plates 250 together in thermal contact with each other within the upper and lower plate stacks 212, 252. For example, the support walls 312 may be compressible or deflectable when the plate stacks 212, 252 are received in the opening 314. Optionally, the support walls 312 may provide a light spring force against the upper and lower plates 210, 250 to avoid binding of the plates 210, 250 within the opening 314. As such, the upper and lower plates 210, 250 may be movable relative to each other within the opening 314, such as to allow articulation of the upper and lower plates 210, 250 within the plate stacks 212, 252, respectively.

Figure 4:
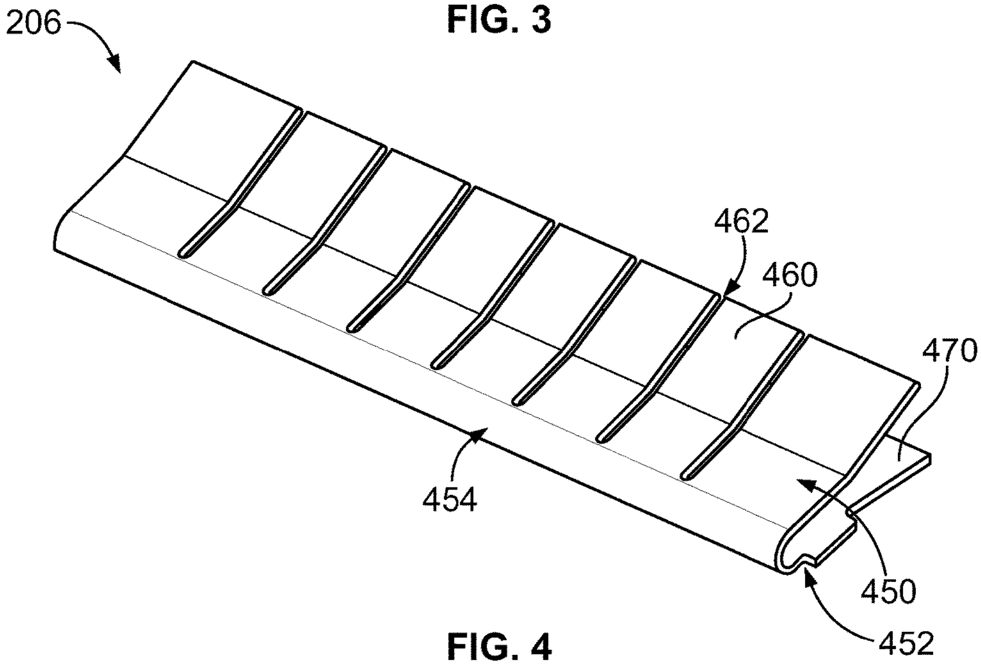
FIG. 4 is a front perspective view of a spring element of the heat sink assembly in accordance with an exemplary embodiment.

FIG. 4 is a front perspective view of the spring element 206 in accordance with an exemplary embodiment. The spring element 206 includes an upper spring member 450 and a lower spring member 452. A connecting section 454 extends between the upper and lower spring members 450, 452. The connecting section 454 may be curved, such as being C-shaped. The connecting section is flexible and configured to spread the upper and lower spring members 450, 452 apart when the connecting section is flexed or compressed. The upper spring member 450 is configured to engage the inner ends 216 of the upper plates 210 (shown in FIG. 3) and is configured to spring bias the upper plates 210 in a first biasing direction (for example, generally upward) generally away from the lower plates 250. The lower spring member 452 is configured to engage the inner ends 256 of the lower plates 250 (shown in FIG. 3) and is configured to spring bias the lower plates 250 in a second biasing direction (For example, generally downward) generally away from the upper plates 210.

In an exemplary embodiment, the upper spring member 450 is segmented to include a plurality of upper spring tabs 460 separated by upper gaps 462. The upper spring tabs 460 are configured to engage corresponding upper plates 210. The upper spring tabs 460 are movable independent from each other, such as to provide independent spring pressure to the corresponding upper plates 210. Optionally, the upper spring tabs 460 may be flared outward away from the lower spring member 452, such as at an angle.

In an exemplary embodiment, the lower spring member 452 is segmented to include a plurality of lower spring tabs 470 separated by lower gaps (not shown, but similar to the upper gaps 462). The lower spring tabs 470 are configured to engage corresponding lower plates 250. The lower spring tabs 470 are movable independent from each other, such as to provide independent spring pressure to the corresponding lower plates 250. Optionally, the lower spring tabs 470 may be flared outward away from the upper spring member 450, such as at an angle.

Figure 5:
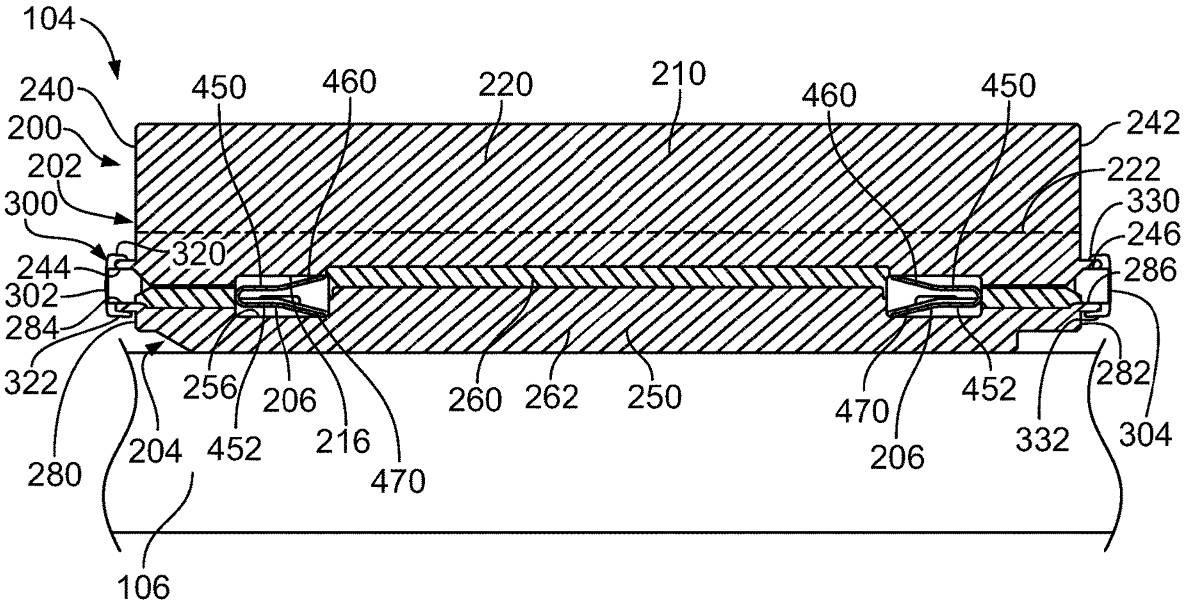
FIG. 5 is a cross-sectional view of a portion of the receptacle assembly showing the heat sink assembly in accordance with an exemplary embodiment.

FIG. 5 is a cross-sectional view of a portion of the receptacle assembly 104 showing the heat sink assembly 200 in accordance with an exemplary embodiment thermally coupled to the pluggable module 106. The frame 300 holds the upper heat sink element 202 and the lower heat sink element 204 with the spring elements 206 located between the upper and lower heat sink elements 202, 204. In the illustrated embodiment, the heat sink assembly 200 includes two spring elements 206, such as a front spring element proximate to the front of the heat sink assembly 200, and a rear spring element proximate to the rear of the heat sink assembly 200; however, the heat sink assembly 200 may include greater or fewer spring elements 206 in alternative embodiments. The spring elements 206 are inboard of the front and the rear of the heat sink elements 202, 204. The spring elements 206 are positioned remote from the front and rear ends. In various embodiments, the spring elements 206 may be located inboard from the front end or the rear end an inset distance that is between approximately 10% and 25% of the length of the heat sink assembly 200. The spring elements 206 bias the upper and lower heat sink elements 202, 204 in opposing directions.

The spring elements 206 force the upper and lower heat sink elements 202, 204 apart from each other. The upper spring members 450 are configured to engage the inner ends 216 of the upper plates 210 (for example, the inner ends 216 of the upper fin plates 220 and/or the inner ends 216 of the upper spacer plates 222 and/or the inner ends 216 of the upper interface plates 224). The upper spring tabs 460 of the segmented upper spring members 450 allow independent movement or articulation of individual upper plates 210 or groups of upper plates 210, thus allowing some upper plates 210 to move independently of other upper plates 210. The lower spring members 452 are configured to engage the inner ends 256 of the lower plates 250 (for example, the inner ends 256 of the lower interface plates 260 and the inner ends 216 of the lower spacer plates 262). The lower spring tabs 470 of the segmented lower spring members 452 allow independent movement or articulation of individual lower plates 250 or groups of lower plates 250, thus allowing some lower plates 250 to move independently of other lower plates 250. The lower spring members 452 urge the lower plates 250 to conform to the upper surface of the pluggable module 106 to reduce thermal resistance at the interface.

In an exemplary embodiment, the frame 300 captures the upper plates 210 and the lower plates 250 within the front and rear rails 302, 304. For example, the front rail 302 includes an upper ledge 320 and a lower ledge 322. The upper plates 210 may engage the upper ledge 320 and the lower plates 250 may engage the lower ledge 322. The heat sink elements 202, 204 are captured between the upper and lower ledges 320, 322. The rear rail 304 includes an upper ledge 330 and a lower ledge 332. The upper plates 210 may engage the upper ledge 330 and the lower plates 250 may engage the lower ledge 332. The heat sink elements 202, 204 are captured between the upper and lower ledges 330, 332. The upper and lower plates 250 may float between the upper and lower ledges 320, 322, 330, 332.

In an exemplary embodiment, each upper plate 210 extends between a front end 240 and a rear end 242. The upper plate 210 includes a front mounting tab 244 at the front end 240 and a rear mounting tab 246 at the rear end 242. The front mounting tab 244 is configured to engage the upper ledge 320 of the front rail 302 and the rear mounting tab 246 is configured to engage the upper ledge 330 of the rear rail 304. The upper spring members 450 of the spring elements 206 bias the upper plates 210 in the first biasing direction to force the mounting tabs 244, 246 toward the upper ledges 320, 330. The mounting tabs 244, 246 may engage the upper ledges 320, 330.

In an exemplary embodiment, each lower plate 250 extends between a front end 280 and a rear end 282. The lower plate 250 includes a front mounting tab 284 at the front end 280 and a rear mounting tab 286 at the rear end 282. The front mounting tab 284 is configured to engage the lower ledge 322 of the front rail 302 and the rear mounting tab 286 is configured to engage the lower ledge 332 of the rear rail 304. The lower spring members 452 of the spring elements 206 bias the lower plates 250 in the first biasing direction to force the mounting tabs 284, 286 toward the lower ledges 322, 332. The mounting tabs 284, 286 may engage the lower ledges 322, 332.

Figure 6:
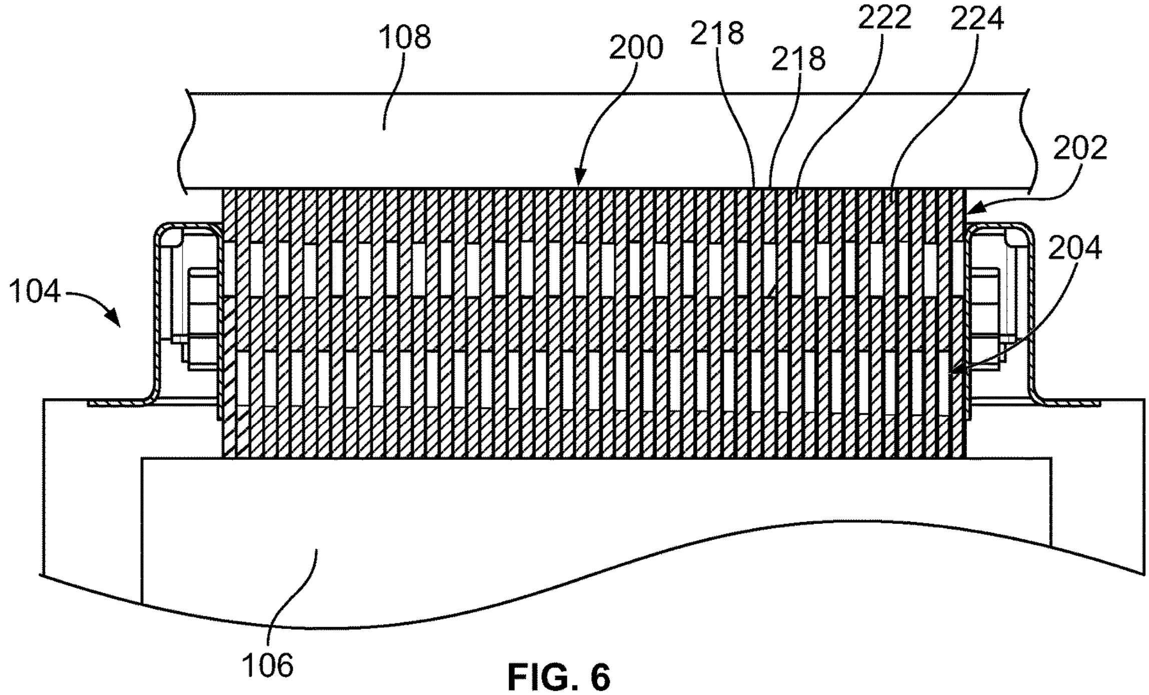
FIG. 6 is a cross-sectional view of a portion of the receptacle assembly showing the heat sink assembly in accordance with an exemplary embodiment.

FIG. 6 is a cross-sectional view of a portion of the receptacle assembly 104 showing the heat sink assembly 200 in accordance with an exemplary embodiment. In the illustrated embodiment, the heat sink assembly 200 is used to thermally couple the pluggable module 106 with a thermal component 108, such as a heat spreader. The lower heat sink element 204 shown in FIG. 6 is the same as the lower heat sink element 204 shown in FIG. 3. The upper heat sink element 202 shown in FIG. 6 is different than the upper heat sink element 202 shown in FIG. 3.

In the illustrated embodiment, the upper heat sink element 202 does not include upper fin plates 220, but rather includes spacer plates 222 interleaved with the upper interface plates 224. The upper heat sink element 202 has a generally planar top, with the outer ends 218 of the spacer plates 222 being provided at the top of the upper heat sink element 202. In the illustrated embodiment, the outer ends 218 of the upper interface plates 224 are generally co-planar with the outer ends 218 of the spacer plates 222 at the top of the upper heat sink element 202. The outer ends 218 of the spacer plates 222 and the upper interface plates 224 define a thermal interface configured to be thermally coupled with the bottom surface of the thermal component 108. The thermal component 108 dissipates heat from the spacer plates 222 and the upper interface plates 224.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A heat sink assembly comprising:

an upper heat sink element including upper plates arranged in an upper plate stack, each upper plate of the upper plates having a front end and a rear end, each upper plate of the upper plates having sides between the front end and the rear end, each upper plate of the upper plates having an inner end and an outer end;

a lower heat sink element including lower plates arranged in a lower plate stack, each lower plate of the lower plates having a front end and a rear end, each lower plate of the lower plates having sides between the front end and the rear end, each lower plate of the lower plates having an inner end and an outer end, the lower plates including lower spacer plates and lower interface plates, the outer ends of the lower spacer plates and the outer ends of the lower interface plates configured to face and thermally couple to an electronic module, the lower interface plates including interface fins extending above the inner ends of the lower spacer plates to interface with the upper plates; and a spring element positioned between the upper heat sink element and the lower heat sink element, the spring element including an upper spring member engaging the inner ends of the upper plates to bias the upper plates in a first biasing direction generally away from the lower plates, the spring element including a lower spring member engaging the inner ends of the lower plates to bias the lower plates in a second biasing direction generally away from the upper plates, the upper spring member and the lower spring member being vertically aligned such that the upper spring member is between the upper plates and the lower spring member and such that the lower spring member is between the lower plates and the upper spring member, the spring element including a connecting section extending between the upper and lower spring members being flexible to spread the upper and lower spring members apart from each other, wherein at least one of the upper spring member or the lower spring member being segmented to include spring tabs individually movable relative to each other.

2. The heat sink assembly of claim 1, wherein adjacent upper plates in the upper plate stack have different heights between the inner ends and the outer ends of the upper plates, and wherein adjacent lower plates in the lower plate stack have different heights between the inner ends in the outer ends of the lower plates.

3. The heat sink assembly of claim 1, wherein the upper plates include upper fin plates, each of the upper fin plates including a base at the inner end and a heat dissipating fin at the outer end, the interface fins of the lower interface plates extending into the upper plate stack to thermally couple with corresponding bases of the upper fin plates.

4. The heat sink assembly of claim 3, wherein the upper plates include upper spacer plates between corresponding upper fin plates and aligned with the interface fins of corresponding lower interface plates.

5. The heat sink assembly of claim 1, wherein the upper plates are movable relative to each other and the lower plates are movable relative to each other and relative to the upper plates.

6. The heat sink assembly of claim 1, wherein the upper spring member is segmented to include upper spring tabs separated by upper gaps, the upper spring tabs engaging corresponding upper plates to bias the upper plates in the first biasing direction generally away from the lower plates, the lower spring member being segmented to include lower spring tabs separated by lower gaps, the lower spring tabs engaging corresponding lower plates to bias the lower plates in the second biasing direction generally away from the upper plates.

7. The heat sink assembly of claim 1, wherein the spring element is C-shaped having the upper and lower spring members vertically aligned with each other and spaced apart from each other between the inner ends of the upper and lower plates.

8. The heat sink assembly of claim 1, wherein the spring element is a front spring element positioned proximate to the front ends of the upper plates and the front ends of the lower plates, the heat sink assembly further comprising a rear spring element positioned proximate to the rear ends of the upper plates and the rear ends of the lower plates.

9. The heat sink assembly of claim 1, further comprising a frame holding the upper heat sink element, the lower heat sink element, and the spring element, the frame including side walls, the upper plate stack and the lower plate stack being arranged between the side walls of the frame.

10. The heat sink assembly of claim 1, further comprising a frame holding the upper heat sink element, the lower heat sink element, and the spring element, the frame including a front rail and a rear rail, the upper plates including front mounting tabs at the front ends and rear mounting tabs at the rear ends, the lower plates including front mounting tabs at the front ends and rear mounting tabs at the rear ends, the front mounting tabs of the upper plates and the lower plates captured by the front rail, the rear mounting tabs of the upper plates and the lower plates captured by the rear rail.

11. The heat sink assembly of claim 10, wherein the front rail includes an upper ledge and a lower ledge, the rear rail includes an upper ledge and a lower ledge, the upper spring member biasing the front mounting tabs of the upper plates toward the upper ledge of the front rail, the upper spring member biasing the rear mounting tabs of the upper plates toward the upper ledge of the rear rail, the lower spring member biasing the front mounting tabs of the lower toward the lower ledge of the front rail, the lower spring member biasing the rear mounting tabs of the lower plates toward the lower ledge of the rear rail.

12. A heat sink assembly comprising:

an upper heat sink element including upper plates arranged in an upper plate stack, each upper plate of the upper plates having a front end and a rear end, each upper plate of the upper plates having sides between the front end and the rear end, each upper plate of the upper plates having an inner end and an outer end, the upper plates including upper fin plates, each of the upper fin plates including a base at the inner end and a heat dissipating fin at the outer end, the upper fin plates being arranged within the upper plate stack at spaced apart locations relative to each other such that airflow channels are formed between the heat dissipating fins;

a lower heat sink element including lower plates arranged in a lower plate stack, each lower plate of the lower plates having a front end and a rear end, each lower plate of the lower plates having sides between the front end and the rear end, each lower plate of the lower plates having an inner end and an outer end, the lower plates including lower spacer plates and lower interface plates, the outer ends of the lower spacer plates and the outer ends of the lower interface plates configured to face and thermally couple to an electronic module, the lower interface plates including interface fins extending into the upper plate stack of the upper heat sink element, the interface fins being thermally coupled to corresponding bases of the upper fin plates; and a spring element positioned between the upper heat sink element and the lower heat sink element, the spring element including an upper spring member engaging the inner ends of the upper plates, the upper spring member biasing the upper plates in a first biasing direction generally away from the lower plates, the spring element including a lower spring member engaging the inner ends of the lower plates, the lower spring element biasing the lower plates in a second biasing direction generally away from the upper plates, wherein at least one of the upper spring member or the lower spring member being segmented to include spring tabs individually movable relative to each other, wherein the entire spring element is positioned at a location remote from the front ends of the upper and lower plates and remote from the rear ends of the upper and lower plates.

13. The heat sink assembly of claim 12, wherein adjacent upper plates in the upper plate stack have different heights between the inner ends and the outer ends of the upper plates, and wherein adjacent lower plates in the lower plate stack have different heights between the inner ends in the outer ends of the lower plates.

14. The heat sink assembly of claim 12, wherein the upper plates include upper spacer plates between corresponding upper fin plates and aligned with the interface fins of corresponding lower interface plates.

15. The heat sink assembly of claim 12, wherein the upper spring member is segmented to include upper spring tabs separated by upper gaps, the upper spring tabs engaging corresponding upper plates to bias the upper plates in the first biasing direction generally away from the lower plates, the lower spring member being segmented to include lower spring tabs separated by lower gaps, the lower spring tabs engaging corresponding lower plates to bias the lower plates in the second biasing direction generally away from the upper plates.

16. The heat sink assembly of claim 12, further comprising a frame holding the upper heat sink element, the lower heat sink element, and the spring element, the frame including side walls, the frame including a front rail between the side walls and a rear rail between the side walls, the upper plate stack and the lower plate stack being arranged between the side walls of the frame, the upper plates including front mounting tabs captured by the front rail and rear mounting tabs captured by the rear rail, the lower plates including front mounting tabs captured by the front rail and rear mounting tabs captured by the rear rail.

17. A receptacle assembly comprising:

a receptacle cage having cage walls defining a cavity having a module channel configured to receive a pluggable module, the cage walls including a top wall above the module channel, the top wall having an opening; and a heat sink assembly coupled to the receptacle cage, the heat sink assembly comprising an upper heat sink element, a lower heat sink element, and a spring element, the upper heat sink element extending above the top wall, the lower heat sink assembly extending into the opening in the top wall to couple to the pluggable module;

the upper heat sink element including upper plates arranged in an upper plate stack, each upper plate of the upper plates having a front end and a rear end, each upper plate of the upper plates having sides between the front end and the rear end, each upper plate of the upper plates having an inner end and an outer end, the upper plates including upper fin plates, each of the upper fin plates including a base at the inner end and a heat dissipating fin at the outer end, the heat dissipating fins being located above the top wall, the upper fin plates being arranged within the upper plate stack at spaced apart locations relative to each other such that airflow channels are formed between the heat dissipating fins;

the lower heat sink element including lower plates arranged in a lower plate stack, each lower plate of the lower plates having a front end and a rear end, each lower plate of the lower plates having sides between the front end and the rear end, each lower plate of the lower plates having an inner end and an outer end, the lower plates including lower spacer plates and lower interface plates, the outer ends of the lower spacer plates and the outer ends of the lower interface plates positioned in the cavity of the receptacle cage to thermally couple to the pluggable module, the lower interface plates including interface fins extending into the upper plate stack of the upper heat sink element, the interface fins being thermally coupled to corresponding bases of the upper fin plates; and the spring element positioned between the upper heat sink element and the lower heat sink element, the spring element including an upper spring member engaging the inner ends of the upper plates, the upper spring member being segmented to include upper spring tabs separated by upper gaps, the upper spring tabs engaging corresponding upper plates to bias the upper plates in a first biasing direction generally away from the lower plates, the spring element including a lower spring member engaging the inner ends of the lower plates, the lower spring member being segmented to include lower spring tabs separated by lower gaps, the lower spring tabs engaging corresponding lower plates to bias the lower plates in a second biasing direction generally away from the upper plates, wherein the upper and lower spring members are vertically aligned with each other between the inner ends of the upper and lower plates such that the upper spring member is between the upper plates and the lower spring member and such that the lower spring member is between the lower plates and the upper spring member and configured to flex outward in the first and second biasing directions, respectively.

18. The receptacle assembly of claim 17, further comprising a frame extending from the top wall of the receptacle cage, the frame holding the upper heat sink element, the lower heat sink element, and the spring element, the frame including side walls, the upper plate stack and the lower plate stack being arranged between the side walls of the frame.

19. The receptacle assembly of claim 17, further comprising a frame extending from the top wall of the receptacle cage, the frame holding the upper heat sink element, the lower heat sink element, and the spring element, the frame including a front rail and a rear rail, the upper plates including front mounting tabs at the front ends and rear mounting tabs at the rear ends, the lower plates including front mounting tabs at the front ends and rear mounting tabs at the rear ends, the front mounting tabs of the upper plates and the lower plates captured by the front rail, the rear mounting tabs of the upper plates and the lower plates captured by the rear rail.

20. The heat sink assembly of claim 1, wherein the spring element is received in an interior space defined between the upper and lower heat sink elements.

21. The heat sink assembly of claim 1, wherein the entire spring element is positioned at a location remote from the front ends of the upper and lower plates and remote from the rear ends of the upper and lower plates.

* * * * *